(12) United States Patent
Bartolini et al.

(10) Patent No.: US 7,815,700 B2
(45) Date of Patent: Oct. 19, 2010

(54) FLUID MIXING DEVICE INSERTED IN OR COMBINED WITH A REACTOR

(75) Inventors: Andrea Bartolini, San Giuliano Milanese-Milano (IT); Luca Basini, Milan (IT); Alessandra Guarinoni, Piacenza (IT); Antonio Bennardo, Milan (IT); Nicola Onorati, Buccinasco-Milano (IT)

(73) Assignee: ENI S.p.A., Rome (IT)

( * ) Notice: Subject to any disclaimer, the term of this patent is extended or adjusted under 35 U.S.C. 154(b) by 170 days.

(21) Appl. No.: 12/090,363

(22) PCT Filed: Oct. 18, 2006

(86) PCT No.: PCT/EP2006/010049

§ 371 (c)(1),
(2), (4) Date: May 7, 2008

(87) PCT Pub. No.: WO2007/045457

PCT Pub. Date: Apr. 26, 2007

(65) Prior Publication Data

US 2008/0244974 A1    Oct. 9, 2008

(30) Foreign Application Priority Data

Oct. 21, 2005    (IT) .......................... MI2005A2002

(51) Int. Cl.
*C01B 3/24* (2006.01)
*B01J 19/00* (2006.01)
*B01F 5/06* (2006.01)

(52) U.S. Cl. ...................... 48/198.1; 422/187; 422/188; 422/189; 422/211; 422/224; 422/239; 48/61; 48/180.1; 48/189.4; 48/189.6; 261/19; 261/23.1; 261/96; 261/97; 261/98; 261/115; 261/118; 137/896

(58) Field of Classification Search ................. 422/187, 422/188, 189, 211, 224, 239; 261/96, 97, 261/98, 19, 23.1, 115, 118; 48/61, 180.1, 48/189.4, 189.6, 198.1; 137/896
See application file for complete search history.

(56) References Cited

U.S. PATENT DOCUMENTS 5,658,497 A * 8/1997 Kumar et al. ............... 252/373

(Continued)

FOREIGN PATENT DOCUMENTS

WO    03 004405    1/2003

*Primary Examiner*—Walter D Griffin
*Assistant Examiner*—Huy-Tram Nguyen
(74) *Attorney, Agent, or Firm*—Oblon, Spivak, McClelland, Maier & Neustadt, L.L.P.

(57) ABSTRACT

A device, system and method of mixing two fluids are described herein. A gaseous first fluid is distributed through a distribution zone to a mixing zone by a bundle of pipes parallel to an axis inside which the first fluid is uniformly distributed. A second fluid is uniformly distributed outside the pipes in the distribution zone. The mixing zone is separated from the distribution zone by a pipe-plate supporting the pipes. The pipe-plate has slits or openings to uniformly discharge the second fluid in an axial flow direction into the mixing zone. The pipes extend beyond the pipe-plate into the mixing zone to partialize an outlet flow of the first fluid. In one aspect, the pipes have different lengths to partialize the outlet flow. In another aspect, a terminal portion of the pipes partializes the outlet flow axially, radially, transversally or a combination thereof in the mixing zone.

15 Claims, 5 Drawing Sheets

U.S. PATENT DOCUMENTS

| | | | |
|---|---|---|---|
| 6,733,692 B2 * | 5/2004 | Dindi et al. | 252/373 |
| 7,029,638 B2 * | 4/2006 | Boyer et al. | 422/194 |
| 2002/0020359 A1 * | 2/2002 | Boyer et al. | 118/726 |
| 2002/0021991 A1 | 2/2002 | Boyer et al. | |
| 2002/0081248 A1 * | 6/2002 | Boyer et al. | 422/187 |
| 2004/0197245 A1 * | 10/2004 | Boyer et al. | 422/195 |
| 2005/0095186 A1 | 5/2005 | McGee | |

* cited by examiner

FLUID MIXING DEVICE INSERTED IN OR COMBINED WITH A REACTOR

The present invention relates to a device for mixing two fluids, preferably a hydrocarbon fuel and an oxidizing stream, such as air, enriched air or oxygen, which can be used, inserted in or combined with a reactor, also in catalytic partial oxidation processes with a short contact time.

Short contact time-catalytic partial oxidation (SCT-CPO) is a process used for the production of synthesis gas (syngas). In catalytic partial oxidation with a short contact time, pre-mixed streams of a hydrocarbon fuel, an oxidant (Air, enriched air or oxygen) and optionally vapor, are fed at pressures ranging from 1 to 80 ATM and at a low temperature (T<400° C.) on a catalytic surface which becomes incandescent.

The reagent mixtures used in short contact time catalytic partial oxidation processes can be flammable. In order to avoid the triggering and propagation of flames, it is therefore advisable to effect the mixing in a limited volume, at temperatures lower than the triggering temperature of the flames and for times shorter than the flame-retarding times. In catalytic partial oxidation, as the "cold" gas of the pre-mixed stream reaches a catalyst which is at a high temperature, it is also appropriate for the reagent gases to have high linear rates, so as to limit heat back-propagation phenomena from the catalytic surface to the stream of gaseous reagents. Furthermore, if the linear rates of the gases also exceed propagation rate of the flames, this extinguishes them.

The characteristics of the mixing system are therefore crucial in this type of process, as, in general, in all processes in which it is necessary to mix a fuel stream and an oxidant stream, avoiding flame reactions.

Various literature documents describe equipment for mixing hydrocarbon and oxidant streams.

US 2005/0095186 claims an apparatus in which the fuel and oxidant are mixed thanks to the tangential motion of the fuel. In our opinion, this method does not prevent the local generation of oxygen concentration gradients, which are potentially harmful as they are capable of causing flame reactions.

US 2004/0133057 describes a method for producing a mixer capable of mixing an oxidant and a fuel stream in safe conditions, as the mixing is effected in a fluid kept under turbulent motion and consequently only micro-quantities of reagents enter into close contact, thus pre-venting possible flame reactions from spreading to the whole mixture. In our opinion, not only is this apparatus not easy to produce and run, but it also does not guarantee that the two streams, at the outlet of the mixer, have been perfectly mixed.

US 2004/0067180 describes a mixer consisting of micro-channels into which the oxidant and fuel are fed separately. It is advisable however for its positioning to be close to the catalytic area, which, in our opinion, can give considerable heat back-propagation problems, with the possibility of triggering flame reactions.

U.S. Pat. No. 6,726,850 claims a CPO process wherein the total oxygen is incrementally fed during several reaction steps. The patent discloses nothing with respect to the geometry of the injection apparatus, but indicates short contact times of the hydrocarbon mix/oxygen (less then 10 msec in the first step and 1 msec in the subsequent steps).

U.S. Pat. No. 5,883,138 claims an apparatus from which the pressurized and pre-heated reagents are injected with a comparable momentum through a mixer consisting of a series of channels and holes which are open towards the catalytic area. The patent discloses that if the residence time of the HC/O$_2$ mix is longer than 9 msec, the methane and oxygen mixtures can start undesired non-catalytic reactions in the gas phase. The same considerations made for US 2004/0067180 are also valid for this patent.

U.S. Pat. No. 6,863,867 claims the use of diffusive mixer groups arranged so as to introduce the charge both radially and tangentially. Each mixer consists of a series of ducts which receive the charge from one end and release it at the opposite end. Also in this case the patent does not disclose how to minimize the formation of regions in which the oxygen/hydrocarbon ratio falls within the flammability ranges.

A device has now been found, using the principle of the partialized outlet of one of the two feeding streams, which allows the technological limits of the known art to be overcome, satisfying the above-mentioned requirements.

The device, object of the present invention, for mixing two fluids, inserted in, or combined with a reactor, substantially comprises the following zones:
* a first feeding zone equipped with means for allowing a first fluid, possibly gaseous under the operating conditions, to enter in an axial direction;
* an underlying distribution zone containing a bundle of pipes preferably parallel to the axis inside which said fluid is uniformly distributed;
* a second feeding zone equipped with means for allowing a second fluid to enter the distribution zone containing the bundle of preferably parallel pipes and to be uniformly distributed outside said parallel pipes;
* a mixing zone separated from the distribution zone by a pipe-plate supporting said pipes, preferably parallel, said pipe-plate having slits or openings in order to uniformly discharge the second fluid in an axial direction into the mixing area, and said parallel pipes extending beyond said pipe-plate into the mixing zone.

The final portion of the parallel pipes is preferably equipped with means suitable for partializing the outlet of the fluid axially and/or radially and/or transversally distributed therein in the mixing zone.

Said parallel pipes, which extend beyond the pipe-plate, can also be of different lengths.

Suitable elements can be positioned in the mixing area, close to the pipe-plate, in order to stop the return of any possible flames.

A porous element can be placed in the mixing zone, immediately under the pipe-plate, which can extend beyond the pipes.

The device, object of the invention, can be situated at the inlet of the reactor.

The diameter of the pipes of the gaseous fluid (oxidant) and of the "slits" is calculated so that the linear rates of the two streams prevent recirculating areas of the streams themselves, which, even if, on the one hand, can be useful for the mixing, on the other they increase the residence time of the gas in the mixing zones, thus increasing the chances of triggering phenomena and flame reaction propagation.

The distance between the elements for blocking possible flame-returns and the ends of the bundle of pipes, is such as to minimize the formation of vortexes which could generate the recycling of a portion of fuel inside the oxidizing stream, thus increasing the chances of flame formation.

The device, object of the invention, can be preferably inserted at the inlet of the reactor, or combined with a reactor: in particular, the reactor described in patent application IT-MI96A000690 can be used.

Said device can also be part of the reactor itself and in this case the equipment including said device is a further object of the present invention.

The apparatus for effecting the catalytic partial oxidation of hydrocarbons is characterized in that it comprises the mixing device as described above, and in that it also comprises a reaction zone (R), consisting of a catalytic bed, with a constant or increasing section along the axis of the apparatus.

A further object of the present invention relates to the catalytic oxidation process of gaseous or liquid fuels, effected by means of equipment having the device described above.

This catalytic partial oxidation process of gaseous fuels selected from hydrocarbon compounds, natural gas and/or LPG, is effected by means of suitable catalytic system using the apparatus described above and through the following steps:

- premixing and possibly heating the reagents consisting of said fuels and oxygen or air or oxygen-enriched air, to temperatures ranging from 25 to 400° C., possibly in the presence of vapor and/or $CO_2$;
- reacting the reagents in the catalytic zone, at inlet temperatures ranging from 5 to 500° C., at space velocity rates ranging from 1,000 to 1,000,000 Nl reagents/L cat.×h, reaching temperatures ranging from 450 to 1,500° C.

In particular, the process according to the invention can be effected for obtaining syngas or unsaturated hydrocarbons (ethylene, styrene, etc.) starting from liquid or gaseous fuels.

The catalysts can consist of oxide carriers on which noble metals are deposited, such as Rh, Ru, Ir, Pt and/or other transition metals such as Ni, Fe, Co. The oxide carriers can consist of metal sponges with different geometries, or metal fibrous carriers on which the same metals are deposited.

The catalysts can consist of nitrides or oxy-nitrides containing noble metals and other transition metals such as Rh, Ru, Ir, Pt, Ni, Fe, Co. These metals can be supported on nitride species as metal aggregates, but they can also be inserted in the chemical formula of the nitride or oxy-nitride (A more detailed description of these catalysts can be found in patent application IT-MI2002A000214).

The catalysts used in the process of the present invention can be in any form, preferably in the form of a fixed bed permeable to a fluid, in particular to a gas. The fixed bed can have any form, and preferably a vacuum degree ranging from 0.4 to 0.95, more preferably from 0.6 to 0.9.

BRIEF DESCRIPTION OF THE DRAWING FIGURES

Some preferred embodiments of the present invention are provided with the help of FIGS. 1-5.

Figure 1:
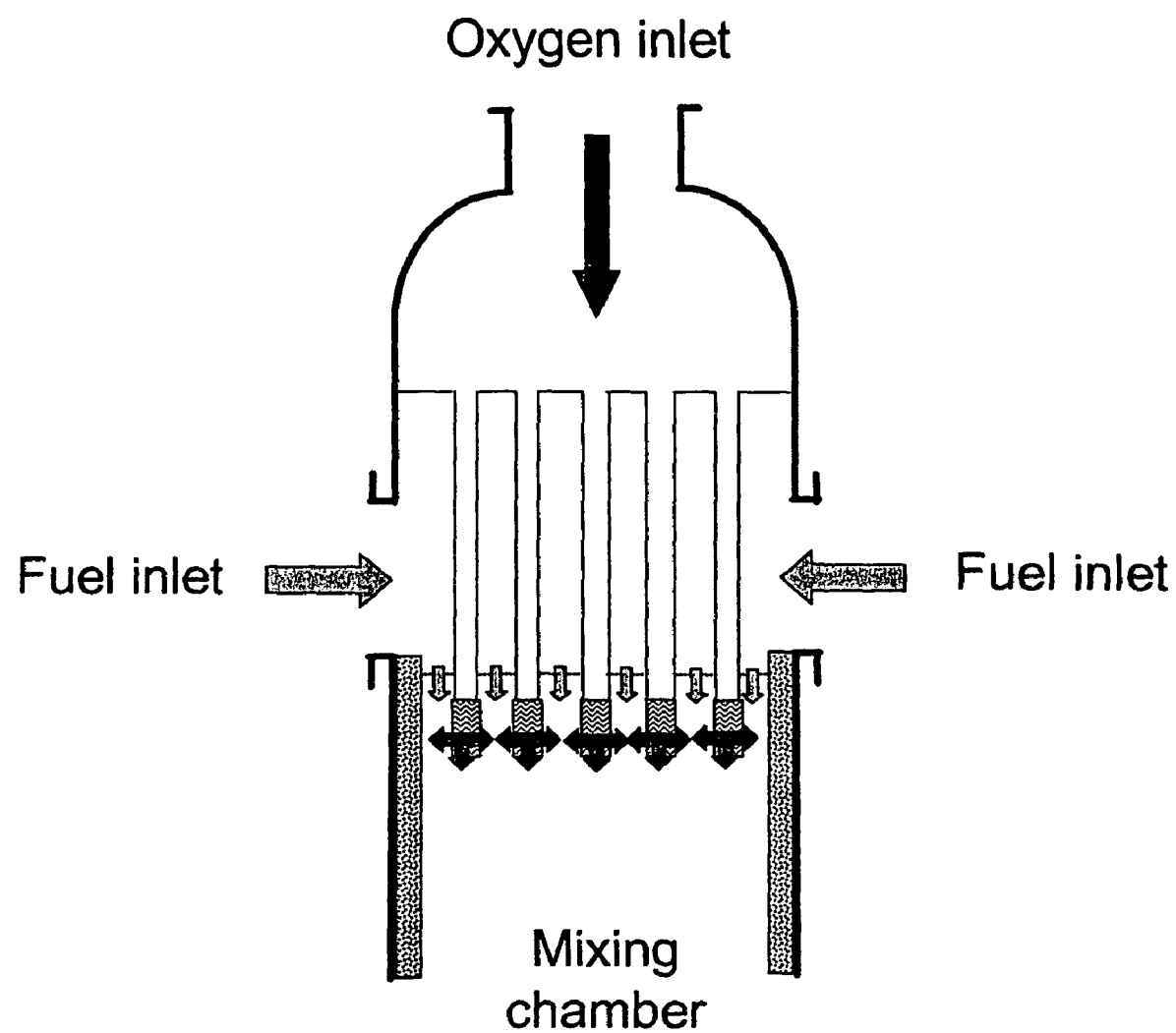
FIG. 1 shows a device having two fuel inlets and an oxidant inlet for mixing fuel with an oxidant.

The device shown in FIG. 1 is equipped with two different inlets, for the fuel and for the oxidant. More specifically, the oxidizing stream enters from the top of the mixer and is distributed in a series of pipes having a reduced diameter. The fuel enters from the side (several inlets can also be present) and is radially distributed in the mixing chamber which envelops the pipes in which the oxygen circulates, finally entering the mixing chamber by means of "slits" present in the pipe-plate.

The pipes of the oxidant, i.e. air, enriched air or preferably oxygen, extend in length beyond the pipe-plate, so that the oxidant is released in an atmosphere "rich" in fuel (the opposite is potentially dangerous).

The final portion of the oxidant pipes is equipped with suitable restriction elements, such as, for example, metal alloys or sintered ceramics, or a series of openings having suitable dimensions, so as to effect partialization along the outlet axis of the feeding. The advantage of said partialized outlet consists in the fact that the formation of mixtures is reduced within the flammability ranges. The inlets of the oxidant and fuel shown in FIG. 1 are only illustrative and should not be interpreted as being a limitation of the invention; other inlets are possible, for example fuel from above, there still being an oxidant/fuel phase separation inside the mixer and the relative positioning of the outlets (oxidant in downstream with respect to the fuel).

Figure 2:
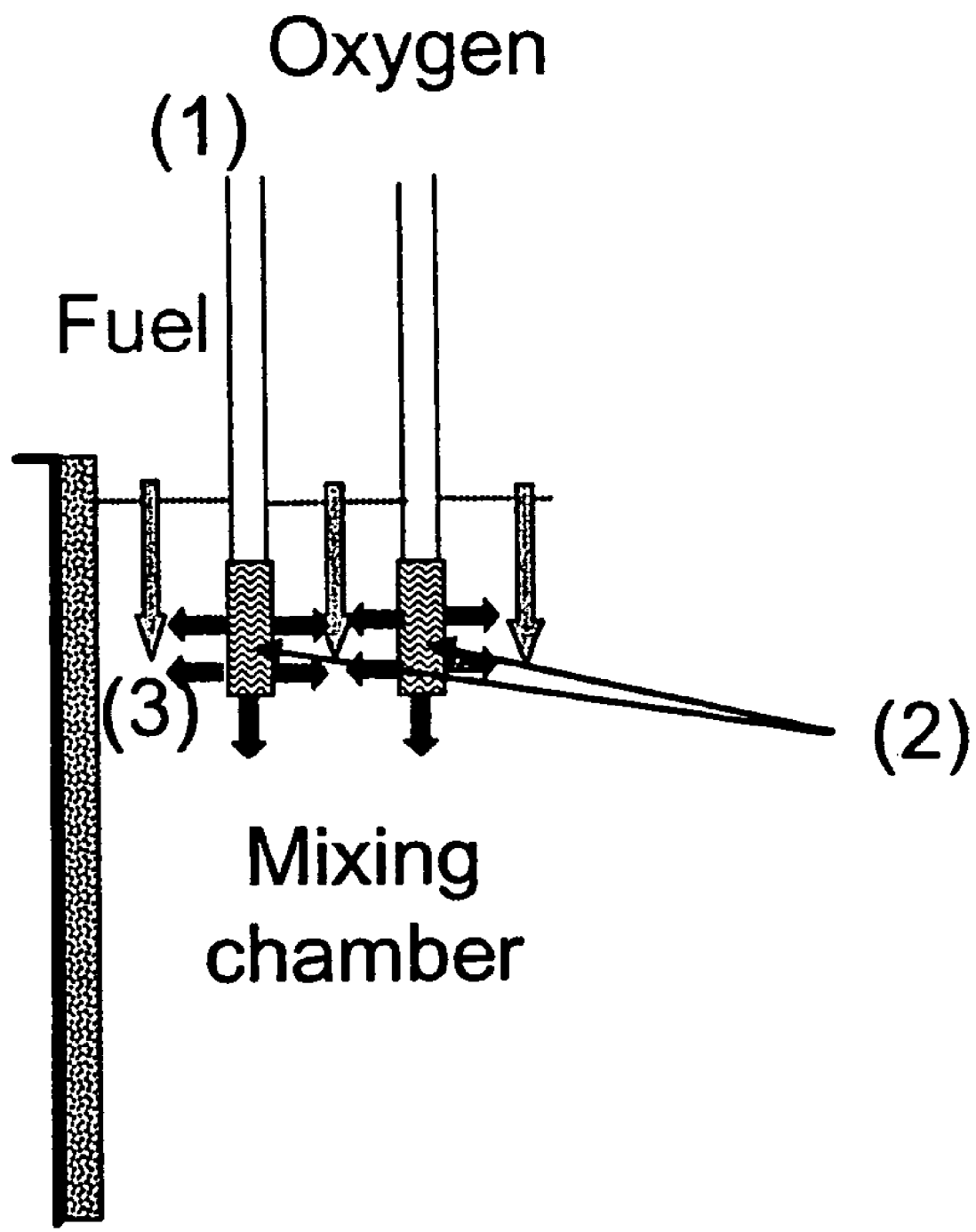
FIG. 2 shows a magnified view of a portion of the device shown in FIG. 1 at which the oxidant partializes and mixes with the fuel.

As shown in FIG. 2, the stream containing oxygen, at the outlet from the relative ducts (1), flows through suitable elements (2) capable of partializing the charge into a series of streams which intersect the hydrocarbon phase (3) according to both perpendicular and parallel trajectories, or vector combinations of the same. The rapid mixing of the streams prevents the local formation of compositions inside the flammability region.

The crossing of the two streams further facilitates the rapid mixing of the phases.

Figure 3:
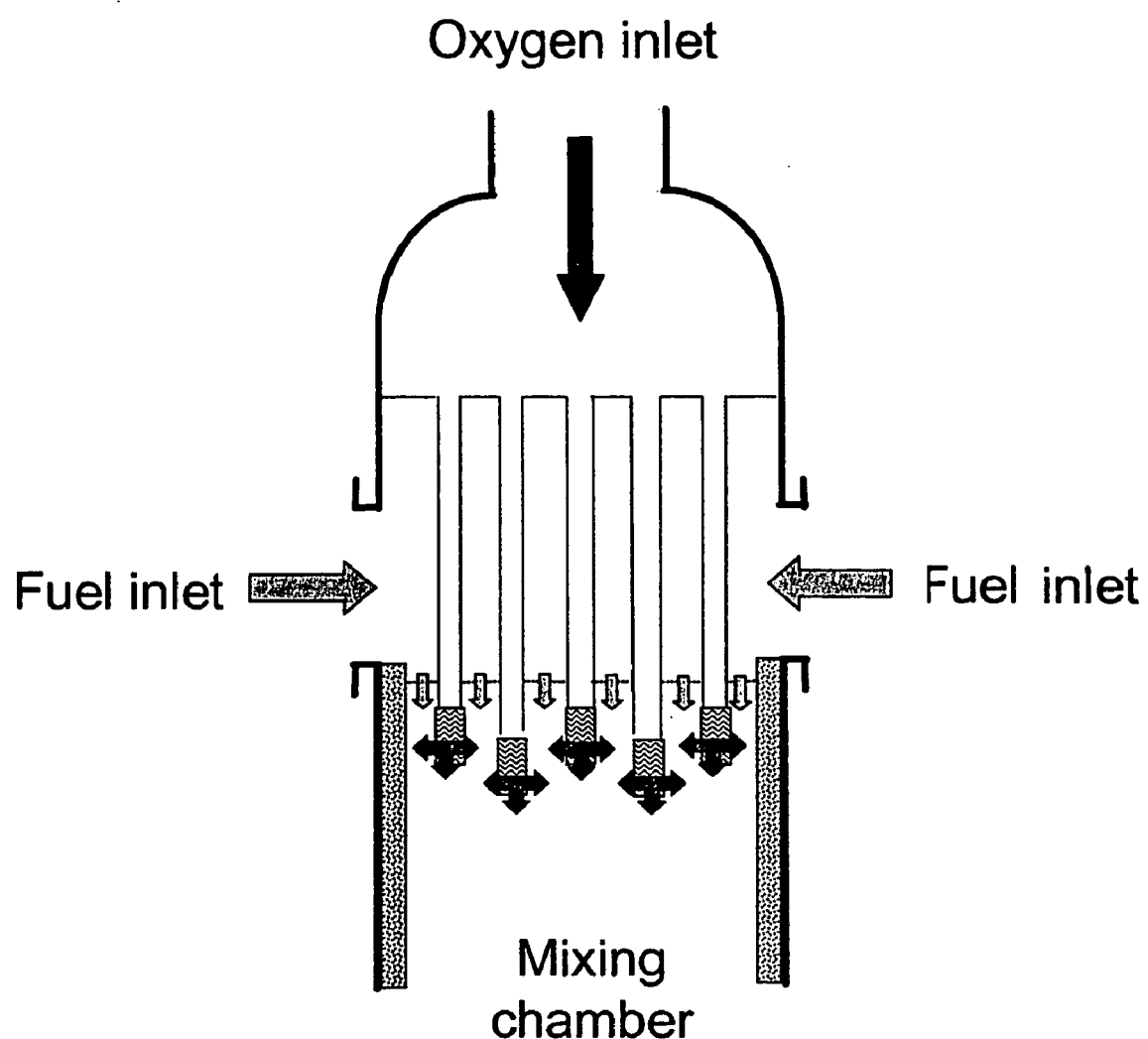
FIG. 3 shows a device similar to the device shown in FIG. 1 with oxidant pipes having different lengths.

An alternative scheme for the mixer, shown in FIG. 3, envisages oxidant pipes with different lengths, so as to further partialize the oxygen release, with all the consequent advantages.

Figure 4:
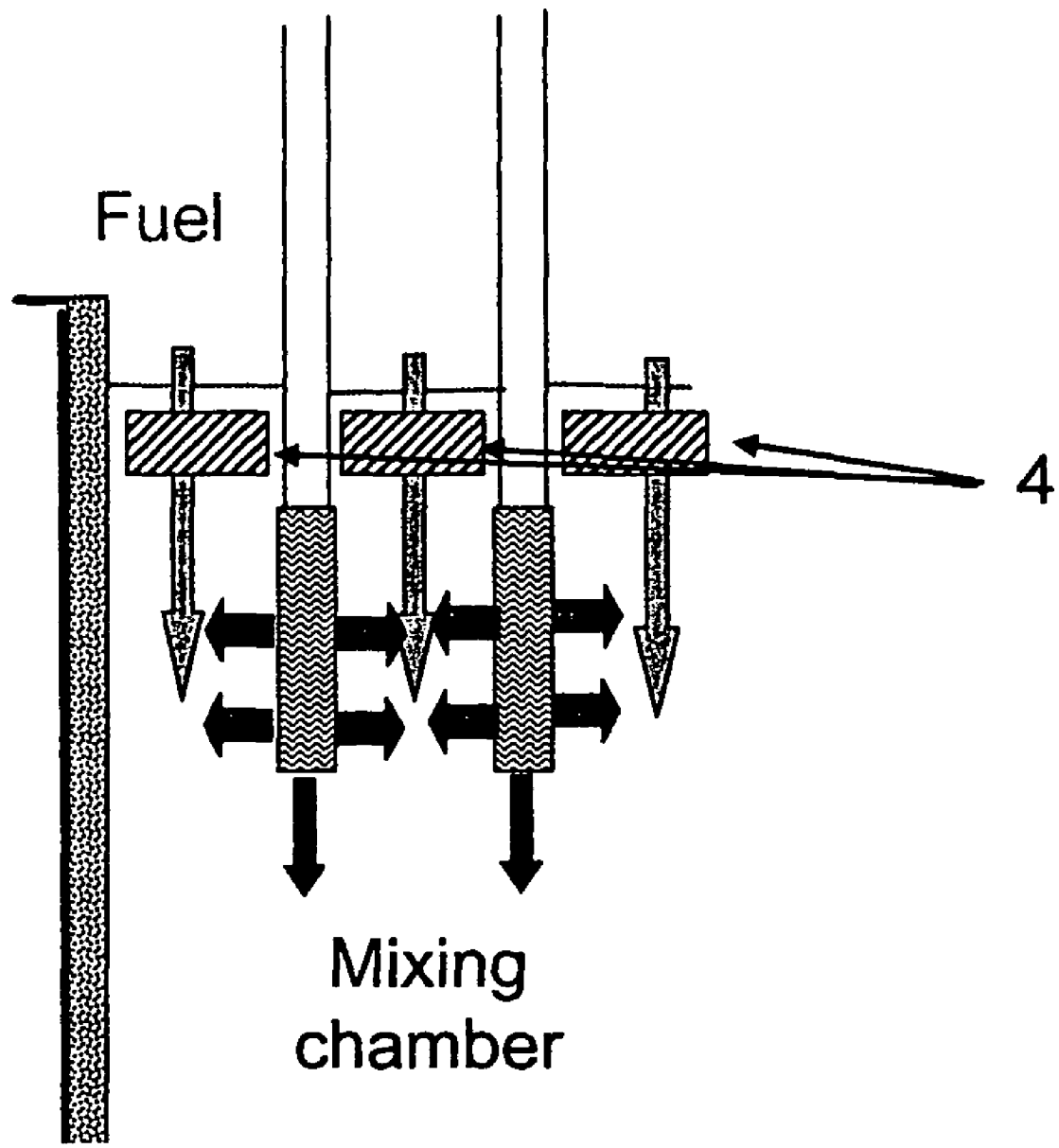
FIG. 4 shows elements for inhibiting flame-returns in a device according to either FIG. 1 or FIG. 3.

FIG. 4 includes suitable elements, within the apparatus of FIG. 2, capable of stopping possible flame-returns.

Figure 5:
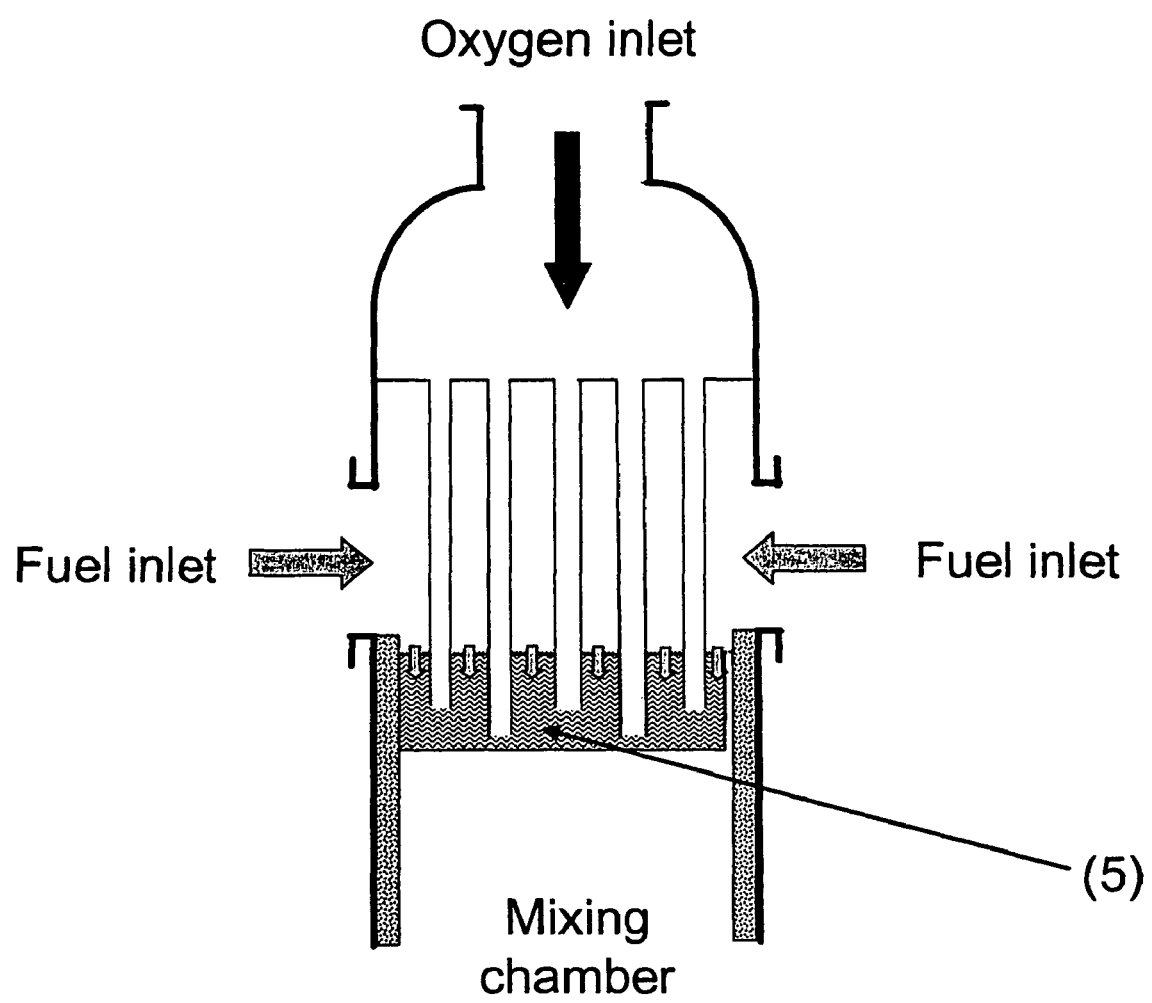
FIG. 5 shows the device shown in FIG. 3 including a porous element positioned around outlets of the oxidant pipes.

In a further configuration shown in FIG. 5, a porous element (5) is positioned at the outlet of the hydrocarbon stream; the outlets of the oxidant stream are also situated inside the porous element, possibly at various heights and downstream of the inlet of the hydrocarbon stream.

The invention claimed is:

1. A device for mixing two fluids, inserted in or combined with a reactor, comprising:
    a first feeding zone including means for allowing a first fluid, gaseous under the operating conditions, to enter in an axial flow direction;
    an underlying distribution zone including a bundle of pipes parallel to an axis inside which said first fluid is uniformly distributed;
    a second feeding zone including means for allowing a second fluid to enter the distribution zone containing the bundle of parallel pipes and to be uniformly distributed outside said parallel pipes;
    a mixing zone separated from the distribution zone by a pipe-plate supporting said parallel pipes,
    said pipe-plate having slits or openings to uniformly discharge the second fluid in the axial flow direction into the mixing zone, and
    said parallel pipes extending beyond said pipe-plate into the mixing zone and having different lengths.

2. The device according to claim 1, wherein a terminal portion of the pipes includes means for partializing an outlet of the fluid distributed therein, axially, radially transversally or a combination thereof in the mixing zone.

3. The device according to claim 1, wherein suitable elements are positioned in the mixing zone, close to the pipe-plate, to stop flame-returns.

4. The device according to claim 1, wherein a porous element is positioned in the mixing zone, immediately behind the pipe-plate, which extends beyond the pipes themselves.

5. A device for mixing two fluids, inserted in or combined with a reactor, comprising:
- a first feeding zone including means for allowing a first fluid, gaseous under the operating conditions, to enter in an axial direction;
- an underlying distribution zone including a bundle of pipes parallel to an axis inside which said first fluid is uniformly distributed;
- a second feeding zone including means for allowing a second fluid to enter the distribution zone containing the bundle of parallel pipes and to be uniformly distributed outside said parallel pipes;
- a mixing zone separated from the distribution zone by a pipe-plate supporting said parallel pipes,
- said pipe-plate having slits or openings in order to uniformly discharge the second fluid in an axial direction into the mixing area,
- said parallel pipes extending beyond said pipe-plate into the mixing zone, and
- a terminal portion of the pipes includes means for partializing an outlet of the fluid distributed therein, axially, radially, transversally or a combination thereof in the mixing zone.

6. The device according to claim 5, wherein the pipes extending beyond the pipe-plate are of different lengths.

7. The device according to claim 5, wherein suitable elements are positioned in the mixing zone, close to the pipe-plate, to stop flame-returns.

8. The device according to claim 5, wherein a porous element is positioned in the mixing zone, immediately behind the pipe-plate, which extends beyond the pipes themselves.

9. An apparatus for effecting catalytic partial oxidations of hydrocarbons, comprising:
- the mixing device as claimed in one of claims 1-4 and 5-8; and
- a reaction zone (R), including a catalytic bed, with a constant or increasing section, along the axis of the apparatus.

10. A catalytic partial oxidation method for a gaseous fuel, including at least one of a hydrocarbon compound, natural gas and LPG, by a catalytic apparatus, the method comprising:
- distributing a gaseous first fluid containing oxygen by a bundle of parallel pipes, inside which the first fluid is uniformly distributed, the pipes parallel to an axis inside which the first fluid is uniformly distributed, into a distribution zone of the apparatus;
- distributing a gaseous second fluid containing the fuel to the distribution zone, the second fluid uniformly distributed outside the pipes;
- partializing an outlet flow of the first fluid into a mixing zone of the apparatus; and
- mixing the first and second fluids in the mixing zone, the mixing zone separated from the distribution zone by a pipe-plate supporting the pipes, the pipe-plate having slits or openings to uniformly discharge the second fluid in an axial flow direction into the mixing zone, and the pipes extending beyond said pipe-plate into the mixing zone.

11. The method according to claim 10, wherein the mixing the first and second fluids is at temperatures ranging from 25 to 400° C., and the method further comprises:
- reacting the mixture in a reaction zone of the catalytic system, at inlet temperatures ranging from 5 to 500° C., at space velocity rates ranging from 1,000 to 1,000,000 Nl reagents/L cat. x h, reaching temperatures ranging from 450 to 1,500° C., the reaction zone having a constant or increasing cross-section along the axial flow direction.

12. The method according to claim 10, wherein the partializing the outlet flow of the first fluid is performed by distributing the first fluid axially, radially, transversally or a combination thereof into the mixing zone.

13. The method according to claim 10, wherein the partializing the outlet flow of the first fluid is performed by varying lengths of the pipes extending beyond the pipe-plate into the mixing zone.

14. The method according to claim 10, further comprising:
- inhibiting flame-returns by positioning suitable elements in the mixing zone close to the pipe-plate.

15. The method according to claim 10, further comprising:
- inhibiting flame-returns by positioning a porous element in the mixing zone, immediately behind the pipe-plate, which extends beyond the pipes themselves.

* * * * *